(12) United States Patent
Meinhardt et al.

(10) Patent No.: US 8,728,174 B2
(45) Date of Patent: May 20, 2014

(54) METHODS AND APPARATUSES FOR MAKING CATHODES FOR HIGH-TEMPERATURE, RECHARGEABLE BATTERIES

(75) Inventors: Kerry D. Meinhardt, Richland, WA (US); Vincent L. Sprenkle, Richland, WA (US); Gregory W. Coffey, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 104 days.

(21) Appl. No.: 13/069,694

(22) Filed: Mar. 23, 2011

(65) Prior Publication Data
US 2012/0240391 A1    Sep. 27, 2012

(51) Int. Cl.
*H01M 4/82*    (2006.01)
(52) U.S. Cl.
USPC ..... 29/623.1; 252/521.1; 429/223; 429/231.9
(58) Field of Classification Search
None
See application file for complete search history.

(56) References Cited

U.S. PATENT DOCUMENTS 5,316,556 A * 5/1994 Morris .................. 29/623.3
6,814,764 B2 * 11/2004 Hosoya et al. ............. 29/623.1
8,329,336 B2 * 12/2012 Soloveichik et al. ......... 429/199
2003/0013011 A1 * 1/2003 Shoji et al. ................. 429/142
2009/0181294 A1 * 7/2009 Yoppolo ..................... 429/142

FOREIGN PATENT DOCUMENTS

GB    2182194 A    9/1985
GB    2281436 B    8/1994
GB    2445972 A    1/2007

OTHER PUBLICATIONS

Coetzer, Johan, et al., "Out of Africa," Pretoria/South Africa, Beta R&D, Oct. 2000, Derby/England.
Sudworth, J.L., "Zebra batteries," Journal of Power Sources, 1994, 105-114 pages, vol. 51, Beta Research and Development, Sinfin, Derby, UK.
Dustman, Cord-H "Advances in ZEBRA Batteries," Journal of Power Sources, 2004, 85-92 pages, vol. 127, Stabio, Switzerland.

* cited by examiner

*Primary Examiner* — Milton I Cano
*Assistant Examiner* — Carmen Lyles-Irving
(74) *Attorney, Agent, or Firm* — Allan C. Tuan

(57) ABSTRACT

The approaches for fabricating cathodes can be adapted to improve control over cathode composition and to better accommodate batteries of any shape and their assembly. For example, a first solid having an alkali metal halide, a second solid having a transition metal, and a third solid having an alkali metal aluminum halide are combined into a mixture. The mixture can be heated in a vacuum to a temperature that is greater than or equal to the melting point of the third solid. When the third solid is substantially molten liquid, the mixture is compressed into a desired cathode shape and then cooled to solidify the mixture in the desired cathode shape.

12 Claims, 1 Drawing Sheet

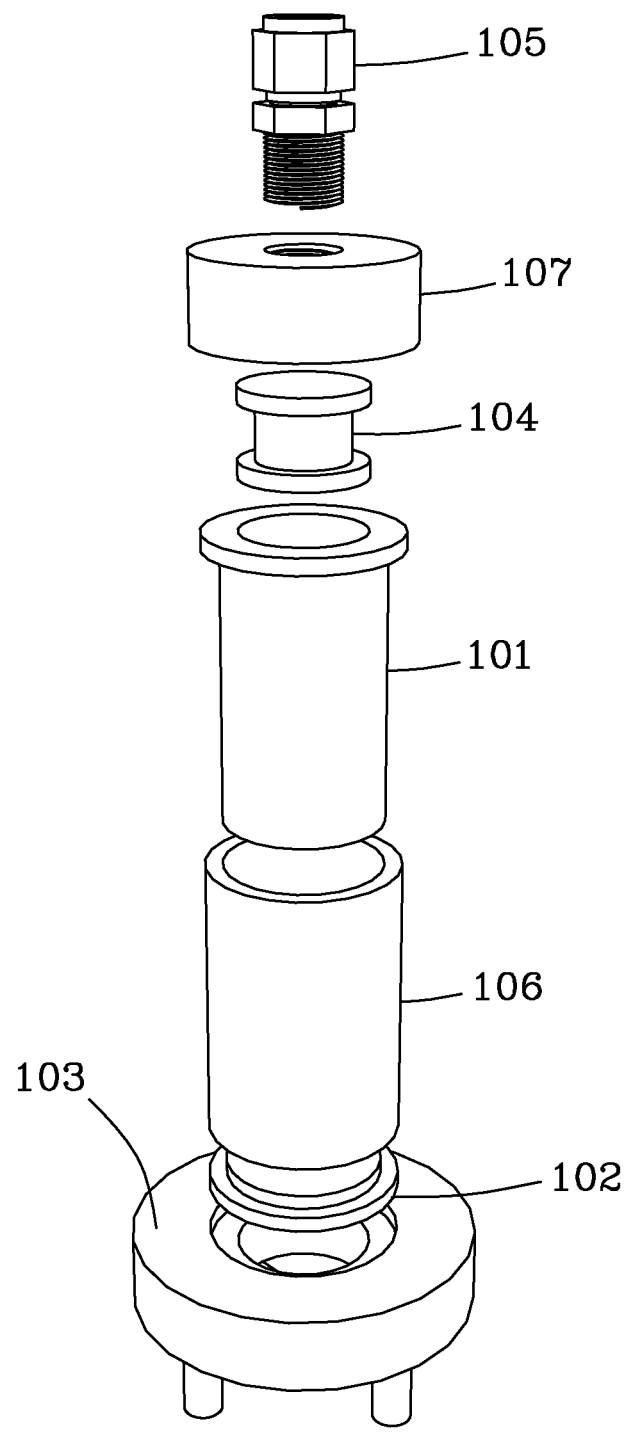

METHODS AND APPARATUSES FOR MAKING CATHODES FOR HIGH-TEMPERATURE, RECHARGEABLE BATTERIES

STATEMENT REGARDING FEDERALLY SPONSORED RESEARCH OR DEVELOPMENT

This invention was made with Government support under Contract DE-AC0576RLO1830 awarded by the U.S. Department of Energy. The Government has certain rights in the invention.

BACKGROUND

Traditional molten salt batteries typically utilize a tubular design. Accordingly, traditional approaches and apparatuses for fabricating cathodes have accommodated the consmints associated with tubular batteries. For example, the traditional technique for forming cathodes in molten salt batteries is to place granules of a transition metal and an alkali metal halide in the batteries and to vacuum infiltrate the granules with a molten salt. This technique requires plumbing for the molten salt and can result in inexact amounts of the salt because the amount added cannot be precisely controlled. More recently, molten salt batteries have been constructed according to a planar design. Accordingly, the approaches and apparatuses for fabricating cathodes can be adapted to better accommodate batteries of any shape and their assembly. Furthermore, the approaches and apparatuses can be improved to provide better quality control over the composition of the cathodes.

SUMMARY

The present invention relates to methods and apparatuses for making cathodes for high-temperature, rechargeable batteries. The invention can enable more accurate control, and greater certainty, over the composition of the cathode relative to traditional methods and apparatuses. Furthermore, fabrication of the cathodes can occur in a separate operation from assembly of the batteries containing the cathodes.

In one embodiment, a first solid comprising an alkali metal halide, a second solid comprising a transition metal, and a third solid comprising an alkali metal aluminum halide are combined into a mixture. The amounts of each of the three solids are known. An example of an alkali metal halide is an alkali metal chloride. Preferably, the alkali metal chloride is NaCl. The transition metal can be Ni. The alkali metal aluminum halide can comprise $NaAlCl_4$.

The mixture can be heated in a vacuum to a temperature that is greater than or equal to the melting point of the third solid. When the third solid is substantially molten liquid, the mixture is compressed into a desired cathode shape and then cooled to solidify the mixture in the desired cathode shape.

An exemplary cathode shape is a pellet. Preferably, the cathode shape is planar. The chamber in which the mixture is combined can define at least a portion of the desired cathode shape. In some embodiments, a piston can be used to compress the mixture in the chamber against a support member. In preferred embodiments, the combining, heating, compressing, and cooling steps are not performed in an electrochemical cell. In such embodiments, cathodes having the desired shape can be installed in a separately constructed battery.

An apparatus for making cathodes for high-temperature, rechargeable batteries can comprise a chamber containing a mixture of a first solid comprising an alkalie metal halide, a second solid comprising a transition metal, and a third solid, comprising an alkali metal aluminum halide. A heater in thermal contact with the chamber can heat the mixture in vacuum to a temperature greater than or equal to the melting point of the third solid. A heat-resistant piston compresses the mixture against a support member into a desired cathode shape while the third solid is substantially molten. The desired shape is defined at least in part by the chamber walls, the piston, and the support member. An exit port allows ejection of the cathode having the desired shape after cooling. In preferred embodiments, the apparatus is not an electrochemical cell.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

DESCRIPTION OF DRAWINGS

Embodiments of the invention are described below with reference to the following accompanying drawings, FIG. 1 is a schematic diagram depicting an apparatus for making cathodes according to one embodiment of the present invention.

DETAILED DESCRIPTION

The following description includes the preferred best mode of one embodiment of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

Referring to FIG. 1 a schematic diagram depicts one embodiment of the present invention. A base support 103, bottom plug 102, and sleeve 101 form a chamber in which the cathodes can be formed. The sleeve is preferably polytetrafluoroethylene (PTFE). The shape of the cathode is determined at least in part by the shapes of the bottom plug and the sleeve.

A mixture of a first solid comprising an alkali metal halide, a second solid comprising a transition metal, and a third solid comprising an alkali metal aluminum halide can be placed in the chamber. A piston 104 is placed in the sleeve and a cap 107 is put on top. Vacuum is applied through a vacuum port 105 and the cathode materials are heated. Heating can be achieved by a band heater placed around tube 106, which can be made of aluminum. The chamber is heated sufficiently to bring the cathode materials to a temperature greater than or equal to the melting point of the alkali metal aluminum halide in the mixture. When the alkali metal aluminum halide is substantially molten, the vacuum is released and the piston 104 is used to compress the contents in the chamber into a pellet having a desired cathode shape. Once the cathode is cooled, it can be pushed out of the sleeve and installed in a battery.

The composition of the cathode is determined by the mixture initially loaded into the chamber. There is no need to infiltrate the alkali metal aluminum halide component so long as the mixture is sufficiently homogeneous prior to heating. Furthermore, the completed cathode can be subjected to quality control analysis outside of a battery prior to installation.

EXAMPLE

Cathode for a ZEBRA® Battery

In a preferred embodiment, the transition metal comprises Ni, and the alkali metal halide comprises NaCl granules. The alkali metal aluminum halide comprises $NaAlCl_4$. These materials are mixed together and placed inside a PTFE tube and heated under vacuum until the $NaAlCl_4$ is melted. Preferably, the temperature is approximately 200° C., or greater. The vacuum is removed and a PTFE piston compresses the mixture into a planar pellet. The pellet is allowed to cool until the $NaAlCl_4$ cools, at which time the pellet is pushed out of the tube and is ready for installation into a planar battery.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A method of making a cathode for a high-temperature, rechargeable battery, the method comprising:
   Combining into a mixture of solids a first solid comprising an alkali metal halide, a second solid comprising a transition metal, and a third solid comprising an alkali metal aluminum halide;
   Heating the mixture in a vacuum to a temperature greater than or equal to a melting point of the third solid;
   Compressing the mixture into a desired cathode shape once the third solid is substantially molten liquid; and
   Cooling to solidify the mixture in a desired cathode shape.

2. The method of claim 1, wherein the desired cathode shape is a pellet.

3. The method of claim 1, wherein the desired cathode shape is planar.

4. The method of claim 1, wherein said combining, heating, compressing and cooling steps are not performed in an electrochemical cell.

5. The method of claim 1, wherein the alkali metal halide comprises an alkali metal chloride.

6. The method of claim 1, wherein the alkali metal halide comprises NaCl.

7. The method of claim 1, wherein the transition metal comprises Ni.

8. The method of claim 1, wherein the alkali metal aluminum halide comprises $NaAlCl_4$.

9. The method of claim 1, further comprising installing the desired cathode shape in a separately constructed battery.

10. The method of claim 1, wherein said combining further comprises combining the mixture in a chamber, the chamber defining at least a portion of the desired cathode shape.

11. The method of claim 10, wherein said compressing further comprises compressing a piston in the chamber against a support member.

12. The method of claim 1, wherein said combining further comprises determining the cathode's composition according to amounts of the first solid, second solid, and third solid combined in said mixture.

* * * * *